(12) United States Patent
Marrani et al.

(10) Patent No.: US 10,414,844 B2
(45) Date of Patent: *Sep. 17, 2019

(54) CROSSLINKABLE VINYLIDENE FLUORIDE AND TRIFLUOROETHYLENE POLYMERS

(71) Applicant: SOLVAY SPECIALTY POLYMERS ITALY S.P.A., Bollate (IT)

(72) Inventors: Alessio Marrani, Lecco (IT); Ivan Wlassics, Garessio (IT); Vito Tortelli, Milan (IT); Ivan Falco, Sedriano (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/365,451

(22) PCT Filed: Dec. 6, 2012

(86) PCT No.: PCT/EP2012/074629
§ 371 (c)(1),
(2) Date: Jun. 13, 2014

(87) PCT Pub. No.: WO2013/087500
PCT Pub. Date: Jun. 20, 2013

(65) Prior Publication Data
US 2015/0005456 A1    Jan. 1, 2015

(30) Foreign Application Priority Data
Dec. 16, 2011 (EP) .................................... 11194151

(51) Int. Cl.
| | | |
|---|---|---|
| *C08F 214/22* | (2006.01) | |
| *C08F 214/18* | (2006.01) | |
| *C08K 5/28* | (2006.01) | |
| *B05D 1/00* | (2006.01) | |
| *C08J 3/24* | (2006.01) | |

(52) U.S. Cl.
CPC .............. *C08F 214/22* (2013.01); *B05D 1/00* (2013.01); *C08F 214/18* (2013.01); *C08F 214/222* (2013.01); *C08J 3/24* (2013.01); *C08K 5/28* (2013.01); *B05D 2506/10* (2013.01); *C08J 2327/16* (2013.01)

(58) Field of Classification Search
CPC ... C08K 5/28; C08K 5/43; C08L 27/16; C08F 214/22
See application file for complete search history.

(56) References Cited

U.S. PATENT DOCUMENTS

| | | | |
|---|---|---|---|
| 3,242,218 A | 3/1966 | Miller | |
| 3,665,041 A | 5/1972 | Sianesi et al. | |
| 3,715,378 A | 2/1973 | Sianesi et al. | |
| 4,523,039 A | 6/1985 | Lagow et al. | |
| 4,990,283 A | 2/1991 | Visca et al. | |
| 5,498,680 A | 3/1996 | Abusleme et al. | |
| 5,663,284 A | 9/1997 | Kominami et al. | |
| 5,958,283 A | 9/1999 | Schmid et al. | |
| 6,103,843 A | 8/2000 | Abusleme et al. | |
| 6,365,693 B1 | 4/2002 | Hung | |
| 7,122,608 B1 | 10/2006 | Brinati et al. | |
| 2002/0049343 A1* | 4/2002 | Hung .................... | C07C 311/49 552/1 |
| 2007/0166838 A1 | 7/2007 | Marsman et al. | |
| 2008/0274355 A1 | 11/2008 | Hewel | |
| 2009/0131569 A1 | 5/2009 | Schwitter et al. | |
| 2010/0324222 A1 | 12/2010 | Hung et al. | |
| 2011/0082271 A1* | 4/2011 | Brinati ................ | C08F 214/182 526/209 |
| 2011/0135861 A1* | 6/2011 | Manzara ................ | C08K 5/28 428/36.9 |
| 2011/0318305 A1 | 12/2011 | Arasappan et al. | |
| 2014/0329970 A1* | 11/2014 | Wlassics ............... | C07C 311/49 525/242 |
| 2014/0378621 A1* | 12/2014 | Tortelli .................... | C08K 5/28 525/351 |

FOREIGN PATENT DOCUMENTS

| | | |
|---|---|---|
| CA | 786877 A | 6/1968 |
| EP | 148482 B1 | 3/1992 |

(Continued)

OTHER PUBLICATIONS

Van Breemen A.J.J.M. et al., "Photocrosslinking of ferroelectric polymers and its application in three-dimensional memory arrays", Applied Physics Letters, 2011, vol. 98(18), p. 183302-183302-3.

Wlassics I. et al., "Perfluoro Allyl Sulfate (FAFS) : a versatile building block for new fluoroallylic compounds", Molecules, 2011, vol. 16, p. 6512-6540.

Karimi Zarchi M.A. et al., "A mild and clean synthesis of alkyl azides from alkyl halides mediated by pol(4-vinylpyridine)-supported sodium azide under non-aqueous conditions", Journal of Applied Polymer Science, 2011, vol. 121, p. 1916-1920—Wiley Periodicals Inc.

Ito M. et al., "A simple and convenient synthesis of alkyl azides under mild conditions", Synthesis, 1995, n°4, p. 376-378.

*Primary Examiner* — Mark S Kaucher

(57) ABSTRACT

The present invention pertains to semi-crystalline fluoropolymer [polymer (F)] comprising: —recurring units derived from vinylidene fluoride (VDF); —from 10% to 50% by moles [with respect to the total moles of recurring units of polymer (F)] of recurring units derived from trifluoroethylene (TrFE); and —from 0.01% to 10% by moles [with respect to the total moles of recurring units of polymer (F)] of recurring units derived from at least one monomer comprising an azide group [monomer (Az)], to a process for its manufacture, to a crosslinkable composition comprising the same, to a process for crosslinking the same and to a method for manufacturing one of electrical and electronic devices using the same.

22 Claims, 1 Drawing Sheet

(56) References Cited

FOREIGN PATENT DOCUMENTS

| | | |
|---|---|---|
| EP | 661304 A1 | 7/1995 |
| EP | 860436 A1 | 8/1998 |
| GB | 1226566 A | 3/1971 |
| WO | 8700538 A1 | 1/1987 |
| WO | 9705122 A1 | 2/1997 |
| WO | 2005064705 A1 | 7/2005 |
| WO | 2009147030 A1 | 12/2009 |
| WO | 2010014274 A1 | 2/2010 |
| WO | 2010021962 | 2/2010 |

\* cited by examiner

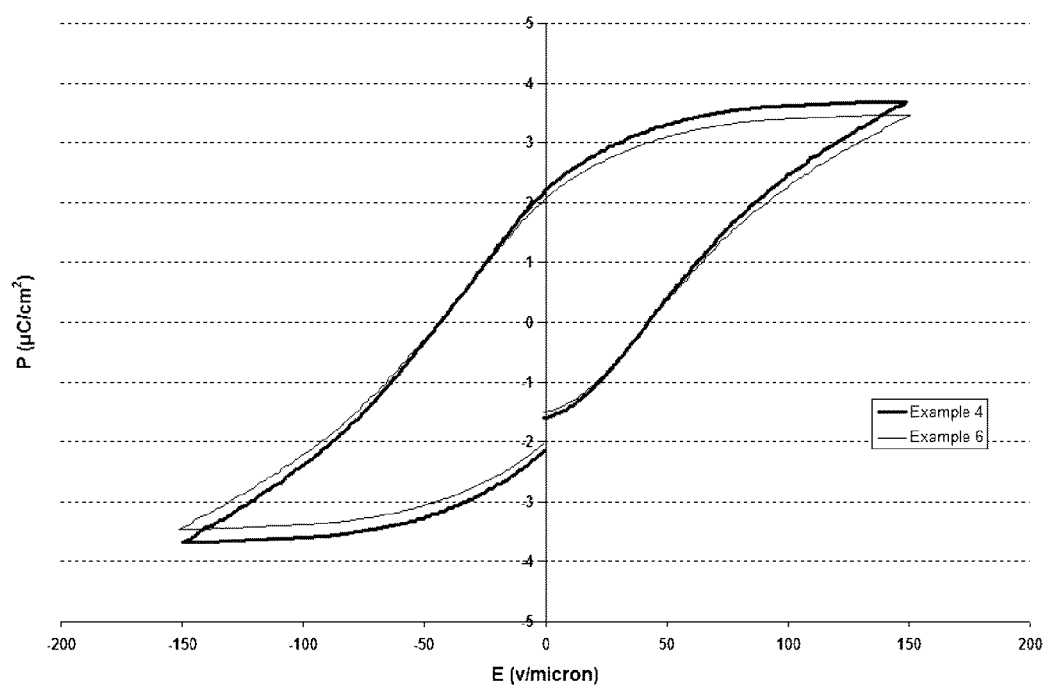

ial energy
CROSSLINKABLE VINYLIDENE FLUORIDE AND TRIFLUOROETHYLENE POLYMERS

CROSS-REFERENCE TO RELATED APPLICATION

This application is a U.S. national stage entry under 35 U.S.C. § 371 of International Application No. PCT/EP2012/074629 filed Dec. 6, 2012, which claims priority to European application No. EP 11194151.4 filed on Dec. 16, 2011. The entire contents of these applications are explicitly incorporated herein by this reference.

TECHNICAL FIELD

The present invention relates to vinylidene fluoride/trifluroethylene copolymers having curing/crosslinking ability and compositions thereof, to a process for the manufacture of said copolymers, to a method for curing the same, and to the use of said copolymers in electrical and electronic devices.

BACKGROUND ART

Vinylidene fluoride (VDF) copolymers comprising recurring units derived from trifluoroethylene (TrFE) monomer have been used extensively in the electronics packaging market due to their ease of processing, chemical inertness and attractive ferroelectric, piezoelectric, pyroelectric and dielectric properties.

As is well known, the term piezoelectric means the ability of a material to exchange electrical for mechanical energy and vice versa and the electromechanical response is believed to be essentially associated with dimensional changes during deformation or pressure oscillation. The piezoelectric effect is reversible in that materials exhibiting the direct piezoelectric effect (the production of electricity when stress is applied) also exhibit the converse piezoelectric effect (the production of stress and/or strain when an electric field is applied).

Ferroelectricity is the property of a material whereby this latter exhibits a spontaneous electric polarization, the direction of which can be switched between equivalent states by the application of an external electric field.

Pyroelectricity is the ability of certain materials to generate an electrical potential upon heating or cooling. Actually, as a result of this change in temperature, positive and negative charges move to opposite ends through migration (i.e. the material becomes polarized) and hence an electrical potential is established.

It is generally understood that piezo-, pyro-, ferro-electricity in copolymers of VDF with TrFE is related to a particular crystalline habit, so called beta-phase, wherein hydrogen and fluorine atoms are arranged to give maximum dipole moment per unit cell.

Copolymers comprising recurring units derived from vinylidene fluoride and trifluoroethylene are typically provided as semicrystalline copolymers which can be shaped or formed into semicrystalline, essentially unoriented and unstretched, thermoplastic film or sheet or tubular-constructed product via well known processing methods such as extrusion, injection moulding, compression moulding and solvent casting.

Nevertheless, more recently, developments of thin film electronic devices and/or assemblies of ferroelectric polymer layers in three-dimensional arrays for increasing e.g. memory density have called for different processing techniques, requiring notably ability of the polymer to be patterned according to lithographic techniques and/or for layers there from to be stacked with annealing treatment on newly formed layer not affecting previously deposited layers.

Within this scenario, thus, cross-linking (elsewhere referred to as 'curing'), which is one of the most known techniques in polymer science to stabilize shape and fix structures, has been the technique of choice for accessing these needs.

Solutions have thus been proposed for conferring to VDF-TrFE copolymers cross-linking or curing ability. Among those solutions, use of azide-containing coupling agents, because of their ability of inserting into carbon-hydrogen bonds under thermal or UV treatment, and yet of their relative robustness, has been considered. So, VAN BREEMEN, A. J. J. M., et al. "Photocrosslinking of ferroelectric polymers and its application in three-dimensional memory arrays". *Appl. Phys. Lett.* 2011, vol. 98, p. 183302. and US 2007/166838 (PHILIPS ELECTRONICS NORTH AMERICA CORPORATION) discloses a photolithography process designed to provide access to three-dimensional memory arrays, said process involving the photocrosslinking of VdF-TrFE polymers using as cross-linking agent 2,6-bis(4-azidebenzylidene)-4-methylcyclohexanone.

Similarly, WO 2005/064705 (KONINKLIJKE PHILIPS ELECTRONICS N.V.) Jul. 14, 2005 discloses patterning by means of photolithography of fluorinated ferroelectric polymer layers, such as those derived from VdF-TrFE (random) copolymers, by addition of a photosensitive cross-linker, such as, e.g., a bis-azide, to a fluorinated polymer spin-coat solution. No mention is made therein of suitable specific bis-azide derivatives.

Nevertheless, this procedure requires a quite delicate metering and mixing of the added azide-containing curing agent into the VDF-TrFE polymer matrix for achieving a reasonably homogeneous mixture; incompatibility between these components might lead to uneven distribution of crosslinking density in cured compound, with regions being left nearly unmodified and regions possessing high cross-linking modification so that piezo-, pyro-, ferro-electricity properties might be affected.

There is thus still a need in the art for VDF/TrFE copolymer materials which can efficiently undergo cross-linking under thermal or UV exposure conditions, yielding a uniformly cured material which still maintains outstanding piezoelectric, ferroelectric, pyroelectric and dielectric properties.

On the other side, the incorporation of azide-containing monomers in fluoropolymer chain has been described in the art, in particular for fluoroelastomers.

Thus, U.S. Pat. No. 6,365,693 (DUPONT DOW ELASTOMERS LLC) Apr. 2, 2002 discloses the incorporation of compounds of formula:

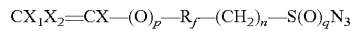

wherein: X, $X_1$ and $X_2$ are independently H or F, p is 0 or 1, n is 0-4, q is 1 or 2, $R_f$ is a perfluoroalkyl or a perfluoroalkoxy group, as cure-site monomers in copolymers of fluorinated monomers, at least one of them being selected from VDF, TFE and chlorotrifluoroethylene (CTFE).

Similarly, US 2010/032422 (DUPONT PERFORMANCE ELASTOMERS L.L.C.) discloses a fluoroelastomer comprising copolymerized units of:
a first monomer selected from vinylidene fluoride and tetrafluoroethylene, and
a cure site monomer having a cure site selected from azide, sulfonyl azide and carbonyl azide groups. Non-limitative examples of suitable sulfonyl azide cure site monomers include the followings: $CF_2=CFOCF_2CF(CF_3)OCF_2CF_2-SO_2N_3$, $CF_2=CFOCF_2CF_2-SO_2N_3$, $CF_2=CFOCF_2CF_2CF_2-SO_2N_3$ and $CF_2=CFOCF_2CF_2CF_2CF_2-SO_2N_3$.

BRIEF DESCRIPTION OF DRAWINGS

FIG. 1 is a plot of the P-E hysteresis curves for films obtained from inventive polymers of Example 4 and 6, as measured by a Ferroelectric Radiant Equipment using an applied equivalent voltage of 150 v/micron with a bipolar drive.

SUMMARY OF INVENTION

It is thus an object of the present invention a semi-crystalline fluoropolymer [polymer (F)] comprising:
recurring units derived from vinylidene fluoride (VDF);
from 10% to 50% by moles [with respect to the total moles of recurring units of polymer (F)] of recurring units derived from trifluoroethylene (TrFE); and
from 0.01% to 10% by moles [with respect to the total moles of recurring units of polymer (F)] of recurring units derived from at least one monomer comprising an azide group [monomer (Az)].

The Applicant has surprisingly found that the incorporation in the VDF/TrFE polymer chain, as above detailed, of recurring units derived from of a monomer (Az) advantageously provide copolymers which can be easily cross-linked, including by thermal treatment and/or under UV irradiation but which still are endowed with outstanding values for breakdown voltage, thus retaining typical piezoelectric, ferroelectric, pyroelectric and dielectric properties of the corresponding unmodified polymers.

The polymer (F) of the invention comprises preferably from 15% to 48% by moles, more preferably from 16% to 45% by moles, even more preferably from 17% to 40% by moles of recurring units derived from trifluoroethylene (TrFE).

The polymer (F) of the invention may further comprise recurring units derived from one or more other fluorinated comonomers [comonomer (F)] different from VDF and TrFE.

The term "fluorinated comonomer [comonomer (F)]" is hereby intended to denote an ethylenically unsaturated comonomer comprising at least one fluorine atom.

The comonomer (F) may further comprise one or more other halogen atoms such as chlorine, bromine and iodine atoms.

Non-limitative examples of suitable comonomers (F) notably include the followings:
(i) $C_2$-$C_8$ perfluoroolefins such as tetrafluoroethylene (TFE) and hexafluoropropylene (HFP);
(ii) perfluoroalkylethylenes of formula $CH_2=CH-R_{f0}$, wherein $R_{f0}$ is a $C_2$-$C_6$ perfluoroalkyl group;
(iii) chloro- and/or bromo- and/or iodo-$C_2$-$C_6$ fluoroolefins such as chlorotrifluoroethylene (CTFE);
(iv) perfluoroalkylvinylethers of formula $CF_2=CFOR_{f1}$, wherein $R_{f1}$ is a $C_1$-$C_6$ perfluoroalkyl group, such as perfluoromethylvinylether (PMVE) and perfluoropropylvinylether (PPVE);
(v) (per)fluorooxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;
(vi) (per)fluoroalkylvinylethers of formula $CF_2=CFOCF_2OR_{f2}$, wherein $R_{f2}$ is a $C_1$-$C_6$ (per)fluoroalkyl group, e.g. $-CF_3$, $-C_2F_5$, $-C_3F_7$, or a $C_1$-$C_6$ (per)fluorooxyalkyl group having one or more ether groups, e.g. $-C_2F_5-O-CF_3$;
(vii) functional (per)fluorooxyalkylvinylethers of formula $CF_2=CFOY_0$, wherein $Y_0$ is selected from a $C_1$-$C_{12}$ alkyl group or (per)fluoroalkyl group, a $C_1$-$C_{12}$ oxyalkyl group and a $C_1$-$C_{12}$ (per)fluorooxyalkyl group having one or more ether groups, $Y_0$ comprising a carboxylic or sulfonic acid group, in its acid, acid halide or salt form;
(viii) fluorodioxoles, especially perfluorodioxoles.

The comonomer (F) is preferably free of hydrogen atoms.

Most preferred fluorinated comonomers (F) are chlorotrifluoroethylene (CTFE), perfluoromethylvinylether (PMVE), tetrafluoroethylene (TFE), hexafluoropropylene (HFP).

Should the fluorinated comonomer (F) be present, the polymer (F) of the invention comprises typically from 2% to 20% by moles, preferably from 3% to 18% by moles, more preferably from 4% to 15% by moles of recurring units derived from said fluorinated comonomer (F), with respect to the total moles of recurring units of polymer (F).

As said, the polymer (F) of the invention is semi-crystalline, that is to say that it possesses a detectable melting point, when submitted to DSM measurements according to ASTM D3418.

As above explained, piezo-, pyro-, ferro-electricity behaviour in polymer (F) is understood to be related to certain crystalline habit (beta-phase): as a consequence, the presence of a certain degree of crystallinity is essential for providing the technical advantages of the present invention.

Advantageously, polymer (F) has a heat of fusion typically of from 10 to 90 J/g, preferably of from 30 to 60 J/g, more preferably of from 35 to 55 J/g as measured according to ASTM D3418.

The melt flow index (MFI) of the polymer (F) of the invention will be selected by the skilled in the art in relation to the processing technology chosen for obtaining final parts (e.g. films or sheets).

It is nevertheless generally understood that the polymer (F) will have a MFI as measured according to ASTM D1238 (230° C., 5 Kg) of advantageously at most 500 g/10 min, preferably of at most 200 g/10 min, more preferably of at most 50 g/10 min.

Polymer (F) comprises from 0.01% to 10% by moles of recurring units derived from at least one monomer comprising an azide group [monomer (Az)].

The skilled in the art will select the appropriate concentration of recurring units derived from monomer (Az) in view of the crosslinking density required in the target field of use of polymer (F). It is nevertheless understood that appropriate crosslinking densities are advantageously obtained when the amount of recurring units derived from monomer (Az) is preferably of at least 0.05%, more preferably of at least 0.1%, with respect to the total moles of recurring units of polymer (F).

Aiming at not impairing piezo-, pyro-, ferro-electricity behaviour of polymer (F), it is also understood that the amount of recurring units derived from monomer (Az) would be preferably of at most 5%, more preferably of at most 3%, with respect to the total moles of recurring units of polymer (F).

Monomer (Az) generally complies with formula (I) herein below:

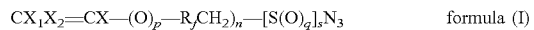

formula (I)

wherein: X, $X_1$ and $X_2$, equal to or different from each other, are independently H or F, p is 0 or 1, n is 0 to 4, s is 0 or 1, q is 1 or 2, $R_f$ is a divalent (hydro)fluorocarbon group, possibly interrupted by one or more ethereal oxygen atoms.

According to a first embodiment, p in formula 1 is 1, that is to say that monomer (Az) is a vinyl ether monomer of formula (II):

$$CX_1X_2=CX-O-R_f-(CH_2)_n-[S(O)_q]_sN_3 \quad \text{formula (II)}$$

wherein: X, $X_1$ and $X_2$, equal to or different from each other, are independently H or F, n is 0 to 4, s is 0 or 1, q is 1 or 2, $R_f$ is a divalent (hydro)fluorocarbon group, possibly interrupted by one or more ethereal oxygen atoms.

According to a variant of this first embodiment, the azide group of formula (II) is a sulfonazide monomer with q=2 and s=1, that is to say that monomer (Az) complies with formula (III):

$$CX'_1X'_2=CX'-O-R'_f-(CH_2)_{n'}-S(O)_2N_3 \quad \text{formula (III)}$$

wherein: X', $X'_1$ and $X'_2$, equal to or different from each other, are independently H or F, preferably F, n' is 0 to 4, preferably n'=0, and $R'_f$ is a perfluoroalkyl group, possibly comprising one or more ethereal oxygen atoms.

Preferred sulfonazide monomers of this embodiments are perfluorovinylethers derivatives of formulae: $CF_2=CF-O-CF_2-CF(CF_3)-O-CF_2CF_2-SO_2N_3$, $CF_2=CF-O-CF_2CF_2-SO_2N_3$, $CF_2=CF-O-CF_2CF_2CF_2-SO_2N_3$, $CF_2=CF-O-CF_2CF_2CF_2CF_2-SO_2N_3$.

These monomers can be manufactured from corresponding sulfonyl fluoride monomers by nucleophilic displacement of fluorine with an azide (typically $NaN_3$).

According to a second embodiment, p in formula (1) is 0, that is to say that monomer (Az) is a monomer of formula (IV):

$$CX''_1X''_2=CX''-R''_f-(CH_2)_{n''}-[S(O)_{q''}]_{s''}N_3 \quad \text{formula (IV)}$$

wherein: X'', $X''_1$ and $X''_2$, equal to or different from each other, are independently H or F, n'' is 0 to 4, s'' is 0 or 1, q'' is 1 or 2, $R''_f$ is a divalent (hydro)fluorocarbon group, possibly interrupted by one or more ethereal oxygen atoms, wherein the $sp^2$ hybridized carbon atom of the terminal double bond =CX''— is bound to a $sp^3$ carbon atom of the $R''_f$ group.

According to a first variant of this second embodiment, the azide group of formula (IV) is a sulfonazide monomer with q=2 and s=1, that is to say that monomer (Az) complies with formula (V):

$$CX''_1X''_2=CX''-R''_f-(CH_2)_{n''}-S(O)_2N_3 \quad \text{formula (V)},$$

wherein: X'', $X''_1$ and $X''_2$, equal to or different from each other, are independently H or F, n'' is 0 to 4, s'' is 0 or 1, q'' is 1 or 2, $R''_f$ is a divalent (hydro)fluorocarbon group, possibly interrupted by one or more ethereal oxygen atoms, wherein the $sp^2$ hybridized carbon atom of the terminal double bond =CX''— is bound to a $sp^3$ carbon atom of the $R''_f$ group.

According to certain embodiments of this first variant, n'' in formula (V) is zero, that is to say that monomer (Az) advantageously complies with formula (VI):

$$CX''_1X''_2=CX''-R^*_f-SO_2N_3 \quad \text{formula (VI)},$$

wherein: X'', $X''_1$ and $X''_2$, equal to or different from each other, are independently H or F, $R^*_f$ is a divalent perfluoroalkyl group, possibly interrupted by one or more ethereal oxygen atoms, preferably of formula $-(CF_2)_{m''}-$, with m'' being an integer of 1 to 12, preferably 2, 4, 6, 8, 10, or 12, more preferably 4 or 6.

Non limitative examples of monomers (Az) complying with formula (VI) here above are compounds of formula (VII):

$$CH_2=CH-(CF_2CF_2)_m-SO_2N_3 \quad \text{formula (VII) with m}$$

being an integer of 1 to 6, preferably 2 or 3.

Compounds of formula (VII) can be easily manufactured from corresponding di-iodo precursors of formula $I-(CF_2CF_2)_m-I$, by selective addition of ethylene on one chain end, selective dehydroiodination, and subsequent functionalization at the remainder chain end to provide the sulphonazide group.

According to other embodiments of this first variant, n'' in formula (V) is an integer different from zero, that is to say that monomer (Az) advantageously complies with formula (VIII):

$$CX''_1X''_2=CX''-R^*_f-(CH_2)_{n*}-SO_2N_3 \quad \text{formula (VIII)},$$

wherein: X'', $X''_1$ and $X''_2$, equal to or different from each other, are independently H or F, n* is an integer of 1 to 4, preferably 2 or 4, more preferably n* is 2; $R^*_f$ is a divalent perfluoroalkyl group, possibly interrupted by one or more ethereal oxygen atoms, preferably of formula $-(CF_2)_{m''}-$, with m'' being an integer of 1 to 12, preferably 2, 4, 6, 8, 10, or 12, more preferably 4 or 6.

Non (imitative examples of monomers (Az) complying with formula (VIII) here above are compounds of formula (IX):

$$CH_2=CH-(CF_2CF_2)_{m1}-(CH_2CH_2)_{n1}-SO_2N_3 \quad \text{formula}$$

(IX) with m1 being an integer of 1 to 6, preferably 2 or 3, and n1 being an integer of 1 to 3, preferably 1.

Compounds of formula (IX) can be easily manufactured from corresponding di-iodo precursors of formula $I-(CF_2CF_2)_m-I$, by insertion/addition of ethylene in iodine-carbon bonds, partial dehydroiodination and subsequent functionalization at the remainder $-CH_2CH_2-I$ chain end to provide the sulphonazide group.

According to further other embodiments of this first variant, the group $-R^*_f-$ in formula (V) is a group of formula $-CF_2-O-R^a_f-$, that is to say that the monomer (Az) complies with formula (X):

$$CX^a_1X^a_2=CX^a-CF_2-O-R^a_f-(CH_2)_{na}-SO_2N_3 \quad \text{formula (X)},$$

wherein: X'', $X''_1$ and $X''_2$, equal to or different from each other, are independently H or F, preferably all are equal to F, na is 0 to 4, preferably na=0 and $-R^a_f$ is a divalent perfluoroalkyl group having 1 to 6 carbon atoms, preferably $-CF_2CF_2-$.

Non limitative examples of monomers (Az) complying with formula (X) here above are compounds of formula (XI):

$$CF_2=CF-CF_2O-CF_2CF_2-SO_2N_3 \quad \text{formula (XI)}.$$

Compounds of formula (IX) can be manufactured by reaction of fluoroallylflurosulfate with $FCO-CF_2-SO_2F$ to yield $CF_2=CF-CF_2O-CF_2-CF_2-SO_2F$ and subsequent nucleophilic substitution with an azide salt (typically $NaN_3$).

According to a second variant of this second embodiment, s in formula (IV) is zero, that is to say that monomer (Az) complies with formula (XII):

$$CX''_1X''_2=CX''-R''_f-(CH_2)_{n''}-N_3 \quad \text{formula (XII)},$$

wherein: X'', $X''_1$ and $X''_2$, equal to or different from each other, are independently H or F, n'' is 0 to 4, s'' is 0 or 1, q'' is 1 or 2, $R''_f$ is a divalent (hydro)fluorocarbon group, possibly interrupted by one or more ethereal oxygen atoms, wherein the sp² hybridized carbon atom of the terminal double bond =CX"— is bound to a sp³ carbon atom of the R"_f group.

According to certain embodiments of this first variant, n" in formula (XII) is zero, that is to say that monomer (Az) advantageously complies with formula (XIII):

   formula (XIII), wherein: X", X"$_1$ and X"$_2$, equal to or different from each other, are independently H or F, R*$_f$ is a divalent perfluoroalkyl group, possibly interrupted by one or more ethereal oxygen atoms, preferably of formula —(CF$_2$)$_{m''}$—, with m" being an integer of 1 to 12, preferably 2, 4, 6, 8, 10, or 12, more preferably 4 or 6.

Non limitative examples of monomers (Az) complying with formula (XIII) here above are compounds of formula (XIV):
CH$_2$=CH—(CF$_2$CF$_2$)$_m$—N$_3$ formula (XIV) with m being an integer of 1 to 6, preferably 2 or 3.

Compounds of formula (XIV) can be easily manufactured from corresponding di-iodo precursors of formula I—(CF$_2$CF$_2$)$_m$—I, by selective addition of ethylene on one chain end, selective dehydroiodination, and subsequent nucleophilic substitution at the remainder chain end to provide the azide group.

According to other embodiments of this first variant, n" in formula (V) is an integer different from zero, that is to say that monomer (Az) advantageously complies with formula (XV):

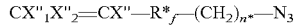   formula (XV), wherein: X", X"$_1$ and X"$_2$, equal to or different from each other, are independently H or F, n* is an integer of 1 to 4, preferably 2 or 4, more preferably n* is 2; R*$_f$ is a divalent perfluoroalkyl group, possibly interrupted by one or more ethereal oxygen atoms, preferably of formula —(CF$_2$)$_{m''}$—, with m" being an integer of 1 to 12, preferably 2, 4, 6, 8, 10, or 12, more preferably 4 or 6.

Non limitative examples of monomers (Az) complying with formula (XV) here above are compounds of formula (XVI):
CH$_2$=CH—(CF$_2$CF$_2$)$_{m1}$—(CH$_2$CH$_2$)$_{n1}$—N$_3$ formula (XVI) with m1 being an integer of 1 to 6, preferably 2 or 3, and n1 being an integer of 1 to 3, preferably 1.

Compounds of formula (XVI) can be easily manufactured from corresponding di-iodo precursors of formula I—(CF$_2$CF$_2$)$_m$—I, by insertion/addition of ethylene in iodine-carbon bonds, partial dehydroiodination and subsequent nucleaphilic substitution at the remainder —CH$_2$CH$_2$—I chain end to provide the sulphonazide group.

The polymer (F) backbone is typically interrupted by short chain branches terminated by end groups having formulae —CF$_2$H and/or —CF$_2$CH$_3$, which typically originate from intra-chain transfer (back-biting) during radical polymerization as shown in the scheme here below:

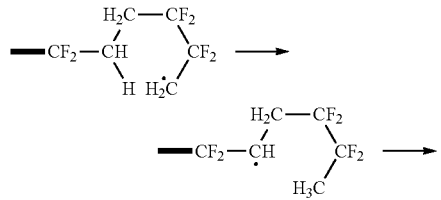

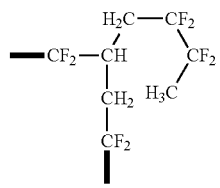

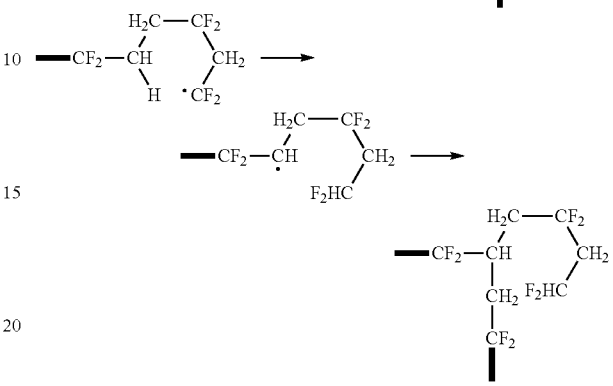

According to a first preferred embodiment of the invention, the polymer (F) comprises end groups of formula —CF$_2$H and/or —CF$_2$CH$_3$ in an amount of less than 30 mmoles per Kg of vinylidene fluoride (VDF) recurring units, preferably of less than 20 mmoles per Kg of VDF recurring units [polymer (F-1)].

The polymer (F-1) of this first preferred embodiment of the invention comprises preferably at least 0.02% by moles, more preferably at least 0.04% by moles of recurring units derived from at least one monomer (Az) as described above.

The polymer (F-1) of this first preferred embodiment of the invention comprises preferably at most 10% by moles, more preferably at most 8% by moles of recurring units derived from at least one monomer (Az) as described above.

According to a second preferred embodiment of the invention, the polymer (F) comprises end groups of formula —CF$_2$H and/or —CF$_2$CH$_3$ in an amount of at least 30 mmoles per Kg of vinylidene fluoride (VDF) recurring units [polymer (F-2)].

Very good results have been obtained with polymers (F-2) according to this second preferred embodiment of the invention comprising end groups of formula —CF$_2$H and/or —CF$_2$CH$_3$ in an amount of advantageously at least 40 mmoles per Kg of VDF recurring units, preferably of at least 50 mmoles per Kg of VDF recurring units.

The polymer (F-2) of this second preferred embodiment comprises preferably from 0.01% to 10% by moles, more preferably from 0.02% to 8% by moles, even more preferably from 0.04% to 6% by moles of recurring units derived from at least one monomer (Az) as described above.

Another object of the present invention is a process for the manufacture of the polymer (F) as defined above, said process comprising polymerizing a monomer mixture comprising vinylidene fluoride, trifluoroethylene and at least one monomer (Az), as above detailed.

The polymer (F) can be manufactured either by an aqueous suspension polymerization process or by an aqueous emulsion polymerization process.

The polymer (F) is preferably manufactured by an aqueous emulsion polymerization process, said process comprising polymerizing vinylidene fluoride (VDF), trifluoroethylene (TrFE), at least one monomer (Az) as described above and, optionally, one or more other fluorinated comonomers (F) as defined above in the presence of at least one radical initiator in a polymerization medium comprising:
  water,
    at least one fluorinated surfactant [surfactant (FS)], and, optionally,
    at least one non-functional perfluoropolyether (PFPE) oil.

The aqueous emulsion polymerization process of the present invention advantageously yields homogeneously dispersed nano-sized droplets in a kinetically stable, optically transparent, isotropic aqueous composition, at room temperature, stabilized by an interfacial film of fluorinated surfactant molecules [surfactant (FS)].

The Applicant has found that the aqueous emulsion polymerization process of the present invention is particularly suitable for manufacturing the polymer (F-2) of the invention, as it enables achieving suitable polymerization rates at limited overall pressure.

Polymerization pressure ranges typically between 10 and 45 bar, preferably between 15 and 40 bar, more preferably between 20 and 35 bar.

The skilled in the art will choose the polymerization temperature having regards, inter alia, of the radical initiator used. Polymerization temperature is generally selected in the range comprised between 80° C. and 140° C., preferably between 95° C. and 130° C.

While the choice of the radical initiator is not particularly limited, it is understood that those suitable for the process according to the invention are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)-[CF(CF_3)\ CF_2O]_m-CF(CF_3)-COO\}_2$ wherein m=0-8, $[ClCF_2(CF_2)_nCOO]_2$, and $[HCF_2(CF_2)_nCOO]_2$ wherein n=0-8; perfluoroalkyl azo compounds such as perfluoroazoisopropane, $[(CF_3)_2CFN=]_2$, $RR^¤N=NR^¤$, wherein $R^¤$ is a linear or branched perfluorocarbon group having 1-8 carbons; stable or hindered perfluoroalkane radicals such as hexafluoropropylene trimer radical, $[(CF_3)_2CF]_2(CF_2CF_2)C^●$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Organic radical initiators as defined above are preferred. Among them, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

According to an embodiment of the process of the invention, a mixture of one or more organic radical initiators as defined above and one ore more inorganic radical initiators as defined above, preferably ammonium persulfate, is advantageously used to accelerate the polymerization process.

The radical initiator is added to the polymerization medium of the process of the invention in an amount ranging advantageously from 0.001% to 20% by weight of the polymerization medium as defined above.

Polymerization is typically carried out in the presence of a chain transfer agent. The chain transfer agent is generally selected from those known in the polymerization of fluorinated monomers such as ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl)carbonate, bis(isobutyl)carbonate. The chain transfer agent may be fed to the polymerization medium at the beginning, continuously or in discrete amounts (step-wise) during the polymerization, continuous or stepwise feeding being preferred.

Emulsion polymerization processes as detailed above have been described in the art (see e.g. U.S. Pat. No. 4,990,283 (AUSIMONT SPA (IT)) Feb. 5, 1991, U.S. Pat. No. 5,498,680 (AUSIMONT SPA) Mar. 12, 1996 and U.S. Pat. No. 6,103,843 (AUSIMONT SPA) Aug. 15, 2000).

By "non-functional perfluoropolyether (PFPE) oil" it is hereby intended to denote a perfluoropolyether (PFPE) oil comprising non-functional end groups.

The non-functional end groups of the perfluoropolyether (PFPE) oil are generally selected from fluoro(halo)alkyls having 1 to 3 carbon atoms, optionally comprising one or more halogen atoms different from fluorine or hydrogen atoms, e.g. $CF_3-$, $C_2F_5-$, $C_3F_6-$, $ClCF_2CF(CF_3)-$, $CF_3CFClCF_2-$, $ClCF_2CF_2-$, $ClCF_2-$.

The non-functional PFPE oil used in the process of the invention typically comprises a (per)fluoropolyoxyalkylene chain [chain $(R_f)$] comprising recurring units, equal to or different from each other, having general formula $-(CJJ')_j-CKK'-O-$, wherein J and J', equal to or different from each other, independently represent a fluorine atom or a $C_1$-$C_6$ (per)fluoro(oxy)alkyl group, K and K', equal to or different from each other, independently represent a hydrogen atom, a fluorine atom, a chlorine atom or a $C_1$-$C_6$ (per)fluoro(oxy)alkyl group and j is an integer comprised between 0 and 3, said recurring units being generally statistically distributed along the (per)fluoropolyoxyalkylene chain [chain $(R_f)$].

The non-functional PFPE oil used in the process of the invention has a number average molecular weight advantageously comprised between 400 and 3000, preferably between 600 and 1500.

The non-functional PFPE oil is preferably selected from the followings:

$$T^1\text{—}O\text{—}[CF(CF_3)CF_2O]_{b1'}(CFYO)_{b2'}\text{-}T^{1'} \quad (1)$$

wherein:
- $T^1$ and $T^{1'}$, equal to or different from each other, are independently selected from $-CF_3$, $-C_2F_5$ and $-C_3F_7$ groups;
- Y, equal or different at each occurrence, is selected from a fluorine atom and a $-CF_3$ group;
- b1' and b2', equal to or different from each other, are independently integers≥0 such that the b1'/b2' ratio is comprised between 20 and 1000 and the (b1'+b2') sum is comprised between 5 and 250; should b1' and b2' be both different from zero, the different recurring units are generally statistically distributed along the perfluoropolyoxyalkylene chain. Said products can be obtained by photooxidation of $C_3F_6$ as described in CA 786877 (MONTEDISON S.P.A.) Jun. 4, 1968 and by subsequent conversion of the end groups as described in GB 1226566 (MONTECATINI EDISON S.P.A.) Mar. 31, 1971.

$$T^1\text{—}O\text{—}[CF(CF_3)CF_2O]_{c1'}(C_2F_4O)_{c2'}(CFYO)_{c3'}\text{-}T^{1'} \quad (2)$$

wherein:
- $T^1$ and $T^{1'}$, equal to or different from each other, have the same meaning as defined above;
- Y, equal or different at each occurrence, has the same meaning as defined above;
- c1', c2' and c3', equal to or different from each other, are independently integers≥0 such that the (c1'+c2'+c3') sum is comprised between 5 and 250; should at least two of c1', c2' and c3' be different from zero, the different recurring units are generally statistically distributed along the perfluoropolyoxyalkylene chain.

Said products can be manufactured by photooxidation of a mixture of $C_3F_6$ and $C_2F_4$ and subsequent treatment with fluorine as described in U.S. Pat. No. 3,665,041 (MONTECATINI EDISON S.P.A.) May 23, 1972.

$$T^1\text{—}O\text{—}(C_2F_4O)_{d1'}(CF_2O)_{d2'}\text{-}T^{1'} \quad (3)$$

wherein:
- $T^1$ and $T^{1'}$, equal to or different from each other, have the same meaning as defined above;
- d1 and d2', equal to or different from each other, are independently integers≥0 such that the d1'/d2' ratio is comprised between 0.1 and 5 and the (d1'+d2') sum is comprised between 5 and 250; should di and d2' be both different from zero, the different recurring units are generally statistically distributed along the perfluoropolyoxyalkylene chain.

Said products can be produced by photooxidation of $C_2F_4$ as reported in U.S. Pat. No. 3,715,378 (MONTECATINI EDISON S.P.A.) Feb. 6, 1973 and subsequent treatment with fluorine as described in U.S. Pat. No. 3,665,041 (MONTECATINI EDISON S.P.A.) May 23, 1972.

$$T^2\text{—}O\text{—}[CF(CF_3)CF_2O]_{e'}\text{-}T^{2'} \quad (4)$$

wherein:
- $T^2$ and $T^{2'}$, equal to or different from each other, are independently selected from $-C_2F_5$ and $-C_3F_7$ groups;
- e' is an integer comprised between 5 and 250.

Said products can be prepared by ionic hexafluoropropylene epoxide oligomerization and subsequent treatment with fluorine as described in U.S. Pat. No. 3,242,218 (E. I. DU PONT DE NEMOURS AND CO.) Mar. 22, 1966.

$$T^2\text{—}O\text{—}(CF_2CF_2O)_{f'}\text{-}T^{2'} \quad (5)$$

wherein:
- $T^2$ and $T^{2'}$, equal to or different from each other, have the same meaning as defined above;
- f' is an integer comprised between 5 and 250.

Said products can be obtained by a method comprising fluorinating a polyethyleneoxide, e.g. with elemental fluorine, and optionally thermally fragmentating the so-obtained fluorinated polyethyleneoxide as reported in U.S. Pat. No. 4,523,039 (THE UNIVERSITY OF TEXAS) Jun. 11, 1985.

$$T^1\text{—}O\text{—}(CF_2CF_2C(Hal')_2O)_{g1'}\text{—}(CF_2CF_2CH_2O)_{g2'}\text{—}(CF_2CF_2CH(Hal')O)_{g3'}\text{-}T^{1'} \quad (6)$$

wherein:
- $T^1$ and $T^{1'}$, equal to or different from each other, have the same meaning as defined above;
- Hal', equal or different at each occurrence, is a halogen selected from fluorine and chlorine atoms, preferably a fluorine atom;
- g1', g2', and g3', equal to or different from each other, are independently integers≥0 such that the (g1'+g2'+g3') sum is comprised between 5 and 250; should at least two of g1', g2' and g3' be different from zero, the different recurring units are generally statistically distributed along the (per)fluoropolyoxyalkylene chain.

Said products may be prepared by ring-opening polymerizing 2,2,3,3-tetrafluorooxethane in the presence of a polymerization initiator to give a polyether comprising repeating units of the formula: $-CH_2CF_2CF_2O-$, and optionally fluorinating and/or chlorinating said polyether, as detailed in EP 148482 B (DAIKIN INDUSTRIES LTD.) Mar. 25, 1992.

$$R^1_f\text{—}\{C(CF_3)_2\text{—}O\text{—}[C(R^2_f)_2]_{j1'}C(R^2_f)_2\text{—}O\}_{j2'}\text{—}R^1_f \quad (7)$$

wherein:
- $R^1_f$, equal or different at each occurrence, is a $C_1$-$C_6$ perfluoroalkyl group;
- $R^2_f$, equal or different at each occurrence, is selected from a fluorine atom and a $C_1$-$C_6$ perfluoroalkyl group;
- j1' is equal to 1 or 2;
- j2' is an integer comprised between 5 and 250.

Said products can be produced by the copolymerization of hexafluoroacetone with an oxygen-containing cyclic comonomer selected from ethylene oxide, propylene oxide, epoxy-butane and/or trimethylene oxide (oxethane) or substituted derivatives thereof and subsequent perfluorination of the resulting copolymer, as detailed in patent application WO 87/00538 (LAGOW ET AL.) Jan. 29, 1987.

The non-functional PFPE oil is more preferably selected from the followings:

(1') non-functional PFPE oils commercially available from Solvay Solexis S.p.A. under the trademark names GALDEN® and FOMBLIN®, said PFPE oils generally comprising at least one PFPE oil complying with either of formulae here below:

$$CF_3\text{—}[(OCF_2CF_2)_m\text{—}(OCF_2)_n]\text{—}OCF_3$$

m+n=40-180; m/n=0.5-2

$$CF_3\text{—}[(OCF(CF_3)CF_2)_p\text{—}(OCF_2)_q]\text{—}OCF_3$$

p+q=8-45; p/q=20-1000

(2') non-functional PFPE oils commercially available from Daikin under the trademark name DEMNUM®, said PFPEs generally comprising at least one PFPE complying with formula here below:

$$F\text{—}(CF_2CF_2CF_2O)_n\text{—}(CF_2CF_2CH_2O)_j\text{—}CF_2CF_3$$

j=0 or integer>0; n+j=10-150

(3') non-functional PFPE oils commercially available from Du Pont de Nemours under the trademark name KRY-TOX®, said PFPEs generally comprising at least one low-molecular weight, fluorine end-capped, homopolymer of hexafluoropropylene epoxide complying with formula here below:

n=10-60

The non-functional PFPE oil is even more preferably selected from those having formula (1') as described above.

The surfactant (FS) typically complies with formula (III) here below:

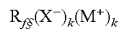 (III)

wherein:
- $R_{fs}$ is selected from a $C_5$-$C_{16}$ (per)fluoroalkyl chain, optionally comprising one or more catenary or non-catenary oxygen atoms, and a (per)fluoropolyoxyalkyl chain,
- $X^-$ is selected from $-COO^-$, $-PO_3^-$ and $-SO_3^-$ groups,
- $M^+$ is selected from $NH_4^+$ and an alkaline metal ion, and
- k is 1 or 2.

Non-limitative examples of surfactants (FS) suitable for the process of the invention notably include the followings:
(a) $CF_3(CF_2)_{n0}COOM'$, wherein $n_0$ is an integer ranging from 4 to 10, preferably from 5 to 7, preferably $n_0$ being equal to 6, and M' represents $NH_4$, Na, Li or K, preferably $NH_4$;
(b) $T-(C_3F_6O)_{n1}(CFXO)_{m1}CF_2COOM''$, wherein T represents a chlorine atom or a (per)fluoroalkoxide group of formula $C_xF_{2x+1-x'}Cl_{x'}O$, wherein x is an integer ranging from 1 to 3 and x' is 0 or 1, $n_1$ is an integer ranging from 1 to 6, $m_1$ is an integer ranging from 0 to 6, M'' represents $NH_4$, Na, Li or K and X represents F or $-CF_3$;
(c) $F-(CF_2CF_2)_{n2}-CH_2-CH_2-RO_3M'''$, wherein R is a phosphorus or a sulfur atom, preferably R being a sulfur atom, M''' represents $NH_4$, Na, Li or K and $n_2$ is an integer ranging from 2 to 5, preferably $n_2$ being equal to 3;
(d) $A-R_{bf}-B$ bifunctional fluorinated surfactants, wherein A and B, equal to or different from each other, have formula $-(O)_pCFX''-COOM^*$, wherein $M^*$ represents $NH_4$, Na, Li or K, preferably $M^*$ representing $NH_4$, X'' is F or $-CF_3$ and p is an integer equal to 0 or 1, and $R_{bf}$ is a divalent (per)fluoroalkyl or (per)fluoropolyether chain such that the number average molecular weight of $A-R_{bf}-B$ is in the range of from 300 to 1800; and
(e) mixtures thereof.

Preferred surfactants (FS) suitable for use in the process of the invention comply with formula (b) as described above.

The polymerization process of the invention typically results in an aqueous latex comprising the polymer (F) as defined above and at least one fluorinated surfactant [surfactant (FS)] as defined above.

The amount of polymer (F) as defined above in the latex directly resulting from the polymerization process typically ranges between 10% and 40% by weight, preferably between 20% and 30% by weight.

The polymer (F) may be isolated and dried by any known technique, taking care that the polymer is not heated enough to cause crosslinking.

Iteratively, an aqueous dispersion emerging from the reactor may be used directly as-is, for example as a coating composition, or it may first be stabilized by addition of surfactant and/or concentrated by processes well known in the art for the preparation of latex coating compositions.

Polymers (F) of this invention may be mixed with other ingredients, and the resulting crosslinkable composition [composition (CC)], which is another object of the present invention, can submitted to crosslinking to yield a cured article.

The crosslinkable composition comprising the polymer (F) as above detailed will generally comprise at least one curing agent. While polymer (F) may undergo self-cross-linking, i.e. can be cured in the absence of any additional co-agent, it is generally preferred to use a curing agent.

Curing agents, when used in combination with polymer (F) in the crosslinking process of the invention, are used in amounts generally of between 0.5% and 10% and preferably between 1% and 7% by weight relative to the polymer (F).

Among these curing agents, the following are commonly used:
- polyallyl derivatives comprising more than one ethylenically unsaturated allylic double bond, including triallyl cyanurate; triallyl isocyanurate (TAIC); tris(diallylamine)-s-triazine; triallyl phosphite; N,N-diallylacrylamide; N,N,N',N'-tetraallylmalonamide;
- polyvinyl derivatives comprising more than one ethylenically unsaturated vinyl double bond, including trivinyl isocyanurate; 2,4,6-trivinyl methyltrisiloxane;
- bis-olefin [bis-olefin (OF)] having general formula:

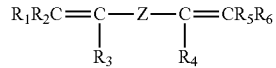

wherein $R_1$, $R_2$, $R_3$, $R_4$, $R_5$ and $R_6$, equal or different from each other, are H or $C_1$-$C_5$ alkyl; Z is a group of formula $-(O)_{e1}-E-(O)_{e2}-$, wherein e1 and e2, equal to or different from each other are independently 1 or 0, and E is a divalent $C_1$-$C_{18}$ group, optionally containing oxygen atoms, preferably at least partially fluorinated, like notably a (per)fluoropolyoxyalkylene radical, e.g. as described in EP 661304 A (AUSIMONT SPA) Jul. 5, 1995;

- triazines substituted with ethylenically unsaturated groups, such as notably those described in EP 860436 A (AUSIMONT SPA) Aug. 26, 1998 and WO 97/05122 (DU PONT) Feb. 13, 1997;
- polyazides compounds comprising more than one azide groups, including notably diazides of formula:

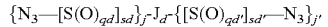

wherein each of j an j', equal to or different from each other, is 0 or an integer of 1 to 3, provided that j+j' is of at least 2, each of sd and sd', equal to or different from each other is independently 0 or 1, each of qd and qd', equal to or different from each other is independently 1 or 2, and $J_d$ is a (hydro)(fluoro)carbon group, optionally containing oxygen atoms, preferably at least partially fluorinated [agent (Cz)].

The bis-olefin (OF) is preferably selected from the group consisting of those complying with formulae (OF-1), (OF-2) and (OF-3):

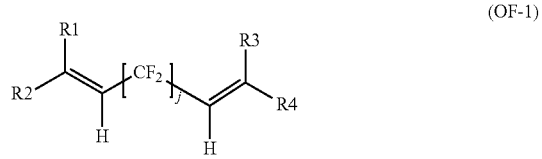

wherein j is an integer between 2 and 10, preferably between 4 and 8, and R1, R2, R3, R4, equal or different from each other, are H, F or $C_{1-5}$ alkyl or (per)fluoroalkyl group;

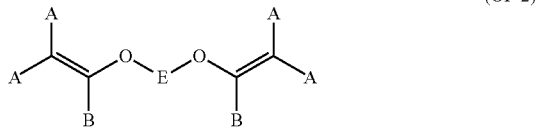
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a $—(CF_2)_m—$ group, with m being an integer from 3 to 5; a preferred bis-olefin of (OF-2) type is $F_2C=CF—O—(CF_2)_5—O—CF=CF_2$.

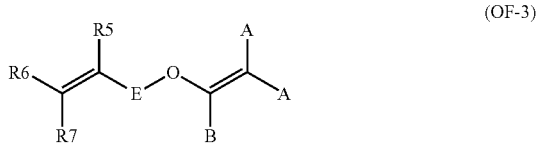
(OF-3)

wherein E, A and B have the same meaning as above defined; R5, R6, R7, equal or different from each other, are H, F or $C_{1-5}$ alkyl or (per)fluoroalkyl group.

The agent (Cz) is preferably a fluorinated polyazide of formula:

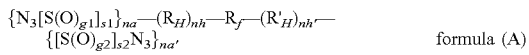
formula (A)

wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal or different from each other are independently 0 or 1, and $R_f$ is selected from the group consisting of i) a $C_3$-$C_{20}$ fluorocarbon group, possibly comprising one or more ethereal oxygen atoms, ii) an oligomer comprising copolymerized units of vinylidene fluoride and trifluoroethylene.

According to a first embodiment, the agent (Cz) advantageously complies with formula (B) herein below:

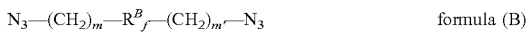
formula (B)

wherein each of m and m' is independently an integer of 1 to 6, and $R^B_f$ is a $C_3$-$C_{10}$ fluorocarbon group, possibly comprising one or more ethereal oxygen atoms.

The agent (Cz) of this first embodiment complies preferably with formula (C) herein below:

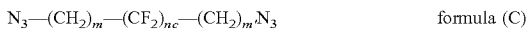
formula (C)

wherein each of m and m' is independently an integer of 1 to 6, preferably m and m'=2, and nc is an integer of 4 to 10, preferably of 4 to 8.

Non limitative examples of agent (Cz) according to this variant are notably those of formula: $N_3—(CH_2)_2—(CF_2)_2—(CH_2)_2—N_3$, $N_3—(CH_2)_2—(CF_2)_4—(CH_2)_2—N_3$, $N_3—(CH_2)_2—(CF_2)_6—(CH_2)_2—N_3$, $N_3—(CH_2)_2—(CF_2)_8—(CH_2)_2—N_3$, $N_3—(CH_2)_2—(CF_2)_{10}—(OH_2)_2—N_3$.

Compounds of formula (C) can be manufactured by telomerisation of tetrafluoroethylene in the presence of iodine, followed by ethylene addition/incorporation onto C—I bonds, and subsequent nucleophilic displacement of iodine by an azide salt, preferably $NaN_3$.

According to a second embodiment, the agent (Cz) advantageously complies with formula (D) herein below:

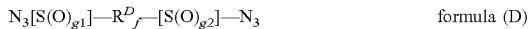
formula (D)

wherein each of g1 and g2, equal to or different from each other, is 1 or 2, and $R^D_f$ is a $C_3$-$C_{20}$ fluoroalkyl group, possibly comprising one or more ethereal oxygen atoms.

Preferably, the agent (Cz) of this second embodiment complies with formula (E) herein below:

formula (D)

wherein $R^E_f$ is a $C_3$-$C_{20}$ fluoroalkyl group, possibly comprising one or more ethereal oxygen atoms.

Non limitative examples of agent (Cz) according to this variant are notably those of formula: $N_3SO_2—C_4F_8—SO_2N_3$, $N_3SO_2—(CF_2)_2—O—C_4F_8—O—(CF_2)_2—SO_2N_3$, $N_3SO_2—(CF_2)_2—O—CF(CF_3)CF_2O—C_4F_8—O—CF_2—CF(CF_3)O—(CF_2)_2—SO_2N_3$, $N_3SO_2—(CF_2)_2—O—CF_2CF(CF_3)O—C_4F_8—O—CF_2—CF(CF_3)O—(CF_2)_2—SO_2N_3$, $N_3SO_2—(CF_2)_2—O—CF_2CF(CF_3)O—C_4F_8—O—CF(CF_3)—CF_2O—(CF_2)_2—SO_2N_3$. Group of formula $—O—C_4F_8—O—$ in each of the above can be any of $—O—(CF_2CF_2)_2—O—$, $—O—CF_2CF_2—CF(CF_3)—O—$, $—O—CF(CF_3)—CF(CF_3)—O—$.

Compounds of formula (E) can be manufactured by fluorine assisted dimerization fo sulfonyl monomers, e.g. of formulae $CF_2=CF—SO_2F$, $CF_2=CF—O—CF_2CF_2SO_2F$, $CF_2=CF—O—CF(CF_3)CF_2OCF_2CF_2SO_2F$, $CF_2=CF—O—CF_2CF(CF_3)OCF_2CF_2SO_2F$, followed by nucleophilic displacement at the fluorosulfonyl group by reaction with an azide salt.

Among above mentioned curing coagents, bis-azides, TAIC, agents (Cz) and bis-olefins (OF), as above detailed, and more specifically those of formula (OF-1), as above detailed, have been found to provide particularly good results; most preferably, agents (Cz) have been found to provide particularly good results.

The polymers (F) of this invention may also be mixed in the composition (CC) with other additives, processing aids and fillers well known in the rubber and plastics industries such as, but not limited to, carbon black, mineral fillers including barium sulfate, talc and silica, fibrillating or non-fibrillating thermoplastic fluoropolymers free from monomer (Az), metal oxides, metal hydroxides and the like.

Still, a method of crosslinking the polymer (F) and/or the composition (CC) as above detailed, for yielding a cured article is another embodiment of the present invention.

Crosslinking of polymer (F) and/or of the composition (CC) of this invention may comprise exposing polymer (F) to UV radiation and/or to heat.

Preferably, crosslinking comprises exposing polymer (F) and/or of the composition (CC) to UV radiation.

The term UV radiation is intended to denote, to the purpose of the invention, electromagnetic radiation with a wavelength shorter than that of visible light, but longer than soft X-rays. It can be subdivided into near UV (380-200 nm wavelength; abbreviation: NUV), far or vacuum UV (200-

10 nm; abbreviation: FUV or VUV), and extreme UV (1-31 nm; abbreviation: EUV or XUV). NUV having wavelength from 200 to 380 nm is preferred in the process of the invention. Either monochromatic or polychromatic radiation can be used.

UV radiation can be provided in the crosslinking process of the invention by any suitable UV radiation source. Preferred UV radiation source for the process of the invention is mercury lighting. It is known that a significant portion of the energy radiated from excited mercury vapours is in the ultra-violet part of the spectrum. In the case of the low pressure discharge, more than half of the total energy supplied is radiated in the short-wave UV region at 253.7 nm. High pressure lamps radiate about 10% of their energy in the long-wave UV region at 365.0 nm, but an appreciable amount is also radiated at shorter wavelengths.

The crosslinking process of the present invention can be used for manufacturing whichever kind of cured articles. Parts of electrical and electronic devices are more preferably manufactured by such a process.

The cured articles can be notably sheets and films, including thin films and nano-layers and/or assemblies of the same.

The cured articles of the invention can be useful notably in different electronic devices including transducers, sensors, actuators, ferroelectric memories, capacitors powdered by electrical devices.

A further object of the present invention is a method for manufacturing one of electrical and electronic devices, comprising using a polymer (F), as above detailed.

Such method generally comprises processing the polymer (F) and/or composition (CC) and crosslinking the same.

Processing can be effected by any known techniques; nevertheless, solution processing techniques, including ink printing, casting, lithographic processes and the like would be preferred.

Crosslinking polymer (F) and/or composition (CC) can be performed as above specified.

The crosslinked polymer (F) of the invention is generally comprised in said devices under the form of bidimensional parts such as films (including thin films, and nano-layers) and sheets, or three-dimensional assemblies of the same.

The parts made of the crosslinked polymer (F) as above detailed are generally comprised as ferroelectric, piezoelectric, pyroelectric or dielectric materials in said electrical and electronic devices.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Differential Scanning Calorimetry (DSC) Analyses

DSC analyses were carried out according to ASTM D 3418 standard method. $T_{m2}$ represents the melting temperature as measured in the second heating cycle. $T_{xx}$ represents the crystallization temperature as measured during intermediate cooling cycle. $T_{Curie2}$ represents the Curie temperature as measured in the second heating cycle.

Determination of Breakdown Voltage

Breakdown voltage values were measured according to ASTM D149-97a standard method on specimens of dielectric fluoropolymer films of given thickness. The higher the breakdown voltage values, the higher the voltage at which current begins to flow through the insulating dielectric fluoropolymer film.

Preparative Example 1—Synthesis of $CF_2=CFOCF_2CF_2SO_2N_3$ [Monomer (Az1)]

According to a procedure similar to the procedures disclosed in U.S. Pat. No. 6,365,693 (DUPONT DOW ELASTOMERS LLC) Apr. 2, 2002 and modified, as below detailed, the above referenced compound was synthesized. In a three necks round bottomed glass flask 1.375 g=21.15 mmoles of $NaN_3$ were suspended in 13 ml of $CH_3CN$, which has been previously dried by distillation over $P_2O_5$ and storage onto 3 A molecular sieves. The mixture was stirred at 500 rpm at 20° C. for about 20 minutes; 5.05 g=18.03 mmoles of $CF_2=CFOCF_2CF_2SO_2F$ (VEFS) were then added dropwise during 19 min. The molar concentration of VEFS ([$CF_2=CFOCF_2CF_2SO_2F$]) in the mixture was thus equal to 1.38 M. The exothermic reaction gave rise to a temperature increase of about 2° C. The reaction mixture, at the end of the addition was found to be milky and became translucent. The mixture was kept under stirring at 20° C. for 48 hours under inert $N_2$ atmosphere. The reaction was brought to completion by heating the mixture for 3 hours at 40° C. The mixture was then cooled at 20° C., and this temperature was then maintained for additional 3 hours. The raw reaction mixture appeared to be an opalescent solution with no visible precipitate. This mixture was poured in 70 ml of distilled water, from which a clear and transparent oil having a acre smelling immediately separated.

From quantitative $^{19}$F-NMR determinations, the so precipitated oil was found to correspond to target product. Aqueous phases were separated and found to contain NaF as reaction by-product.

Yield=57% with respect to the starting amount of VEFS.

Selectivity towards $^{a,b}CF_2=^{c}CFO^{d}CF_2^{e}CF_2SO_2N_3$=78% moles.

Remaining 22% moles was found to correspond to $N_3^{f}CF_2^{g}CFHO^{h}CF_2^{i}CF_2SO_2N_3$.

$^{19}$F-NMR; (CDCl$_3$; ppm): a: −110; b: −118; c: −133; d: −80.2; e: −110.4; f: −90; g: −142 ($J^1_{H,F}$=47 hz); h: −78→−83; i: −110.4

FT-IR (KBr; cm$^{-1}$): 1839 ($CF_2=CFO$— st.); 2156 (–N$_3$ st.); 1421+1463 (—SO$_2$—N$_3$ st.); 1200-1100 (CF st.).

Preparative Example 2—Synthesis of $CF_2=CFCF_2OCF_2CF_2SO_2N_3$ [Monomer (Az2)]

The precursor $FSO_2CF_2CF_2OCF_2CF=CF_2$ was prepared according to methods described in the literature (WLASSICS, I., et al. Perfluoro Allyl Sulfate (FAFS): a Versatile Buildng Block For New Fluoroallylic Compounds. *Molecules*. 2011, vol. 16, p. 6512_6540.).

Synthetic procedure described above for comparative azide compound (1) was modified so as to ensure minimizing contact between the allylether and the NaF (which is a by product of the reaction) and which could catalyze decomposition of vinyl ether precursor to perfluoropropylene and $FO_2S$—$CF_2$—COF.

In a glass cylindrical jacketed reactor, with three inlets, 15.15 mmoles=5.00 g of $FSO_2CF_2CF_2OCF_2CF=CF_2$ were introduced, in combination with 90 μl of a phase transfer agent commercially available as Aliquat ($CH_3$—N—[($CH_2$)$_7CH_3$]$_3^+$Cl$^-$), corresponding to 1% v/v. The solution so obtained was cooled at 15° C. using a cryostat connected to the reactor jacket. Using an automatic dispensing syringe containing a solution made of 7.5 ml of distilled $H_2O$ and 2.395 g=36.85 mmoles of $NaN_3$, said solution was added dropwise at a rate of 0.1 eq. $NaN_3$/h; reactor temperature was kept at 15° C. during the whole addition time (about 24 hours). Temperature was then raised to 20° C. for further 8 hours. At the end of the reaction, the reaction mixture was composed of two phases. Upper phase, composed of $H_2O$, NaF and residual $NaN_3$ was discarded. Lower phase was recovered and centrifuged at 15° C. and 4000 rpm during 20 minutes so as to eliminate solid particulate residues. A colorless and clear oil was obtained having a characteristic acre smell.

Yield (after purification and separation)=65% moles.

Selectivity=55/45 NB-A=$^{a,b}CF_2=^cCF^dCF_2O^eCF_2^fCF_2SO_2N_3$; B=$N_3{}^gCF_2{}^hCFH^iCF_2O^lCF_2{}^mCF_2SO_2N_3$ $^{19}$F-NMR; ($CDCl_3$; ppm): a: −89; b: −102; c: −185.4; d: −72.3; e: −79.3 (AB); f: −109.3; g: −78→−82 (m); h: −206 ($J^1_{H,F}$=48 hz); i: −74.5; →−83; l: −79.3 (AB); m: −109.3.

FT-IR (KBr; cm$^{-1}$): 1792 ($CF_2=CF-CF_2$ st.); 2163 (—$N_3$ st.); 1464+1384 (—$SO_2$—$N_3$ st.); 1200-1100 (CF st.).

Preparative Example 3—Synthesis of $CH_2=CH(CF_2)_6CH_2CH_2N_3$ [Monomer (Az3)]

A di-iodinated precursor was manufactured by tetrafluoroethylene ($C_2F_4$) telomerization with iodine ($I_2$) in the presence of diterbutylperoxide (DTBP), and isolating a $I(CF_2)_6I$ fraction.

Ethylene addition was then performer with ethylene at a temperature of 180° C. and under a $C_2H_4$ pressure of 50 atm, so as to obtain corresponding addition product of formula $ICH_2CH_2(CF_2)_6CH_2CH_2I$ with a selectivity of more than 98.5%. Less than 1.5% moles of the telomer gave rise to the oligomer $I(C_2H_4)_2(CF_2)_6CH_2CH_2I$.

The compound of formula $ICH_2CH_2(CF_2)_6CH_2CH_2I$ was submitted to partial dehydro-iodination with 0.5 molar equivalent of KOH in $C_2H_5OH$ at 75° C.; distillation of the raw reaction mixture enabled isolating $ICH_2CH_2(CF_2)_6CH=CH_2$ with a purity of about 95% by moles.

In a glass reactor equipped with a condenser cooled with water, magnetic stirring, thermometer and dropping funnel, were introduced 0.876 g (13.48 mmoles) of $NaN_3$, solubilized in 11 ml of distilled $H_2O$, and 341 μl of phase transfer catalyst Aliquat (1% on total volume), which remained as separated phase.

So formed dishomogeneous mixture was cooled at 3° C. using an ice bath. An homogeneous solution containing 5.0 g (10.37 mmoles) of $ICH_2CH_2(CF_2)_6CH=CH_2$ in 20 ml of $CH_2Cl_2$ was then added dropwise during 15 minutes. After 1 hour stirring (750 rpm) at 3° C., the reaction mixture was let to slowly revert to 25° C. during 60 minutes, and maintained at this temperature for additional 23 hours. Lower phase was then separated, and gel chromatography separation conditions were tested by TLC (developed in $I_2$ chamber), yielding two dots, a first dot ($R_f$=0) which was found to be the residual Aliquat, showing at $^1$H-NMR analysis typical aliphatic peaks between 1.5 and 0.5 ppm; and a second dot ($R_f$=0.42), which was found to be the target azide compound.

The $CH_2Cl_2$ solution was then chromatographied through a silica column having h=15 cm and diameter=1.5 cm, using n-hexane (4 times volume of the column) as eluent. The combined organic eluated fractions were dried over $MgSO_4$ and then filtered. After removal of the solvent at 30° C. under vacuum (from 760 to 25 mm Hg), a pale yellow oil having an acre smell was obtained.

Isolated Yield=94.7% moles

Selectivity=100%

Density=1.730 g/ml.

$^aCH_2=^bCH^cCF_2^dCF_2^eCF_2^fCF_2^gCF_2^hCF_2iCH_2^lCH_2N_3$ $^{19}$F-NMR; ($CDCl_3$; ppm): c: −112.2; d: −118.8; e: −120.6; f: −121; g: −119.4; g: −112.2.

$^1$H-NMR ($CDCl_3$; ppm): a: 6.0 (m); b: 5.8 (m).

FT-IR (KBr; cm$^{-1}$): 2955 (—$CH_2$— st); 2107 (—$N_3$ st.); 1654 ($CH_2=CH$— st.); 1255 (—C—N— st.); 1200-1140 (CF st.).

Polymerization Runs

Polymerization Example 4—Polymerization of VDF/TrFE in the Presence of Monomer (Az2) (5% Moles)

In an AISI 316 steel up and over autoclave 46.2 ml of demineralized water were introduced. At room temperature, 3.38 g of sodium based micro emulsion obtained as described in Example 1 of U.S. Pat. No. 7,122,608 (SOLVAY SOLEXIS S.P.A.) Oct. 17, 2006, 0.55 g of monomer (Az2) of formula $CF_2=CFCF_2OCF_2CF_2SO_2N_3$ were then added, followed by 2.36 absolute bar of TrFE, 9.07 absolute bar of VDF which were metered from cylinders. Then, using a pump, 270 ml of a solution of ammonium peroxidisulphate (APS) diluted in water with a concentration of 0.1% in weight were fed to start polymerization. Then the temperature was brought to set-point temperature of 70° C., wherein pressure value in the autoclave was found to be 23.1 absolute bars.

Keeping constant the reaction temperature, the pressure was let to fall down to 14.2 abs bar. Then the reactor was cooled at room temperature, the latex was recovered and freezed for 48 hours and once unfreezed the so-coagulated polymer was washed with demineralized water and dried at 80° C. for 48 hours. 6.2 grams of polymer were obtained, whose nominal composition was as follows: VDF: 71.5% moles; TrFE: 23.5% moles; monomer (Az2): 5% moles.

Polymerization Example 5—Polymerization of VDF/TrFE in the Presence of Monomer (Az1) (10% Moles)

Same procedure as detailed in Polymerization Example 3 was followed except by using 1.1 g of monomer (Az1) of formula $CF_2=CFOCF_2CF_2SO_2N_3$ instead of monomer (Az2). Final pressure was about zero. 9.1 grams of polymer were obtained, whose nominal composition was as follows: VDF: 67.5% moles; TrFE: 21.5% moles; monomer (Az1): 10% moles.

Polymerization Example 6—Polymerization of VDF/TrFE in the Presence of Monomer (Az1) (5% Moles)

Similar procedure as in Polymerization Example 3 was followed, except by using 0.55 g of monomer (Az1) of formula $CF_2=CFOCF_2CF_2SO_2N_3$ instead of monomer (Az2), and setting set-point polymerization temperature at 105° C., and continuing polymerization 'till pressure fell to 4.2 abs bar. 9.6 g of polymer were obtained, whose nominal composition was as follows: VDF: 71.5% moles; TrFE: 23.5% moles; monomer (Az1): 5% moles.

Polymerization Example 7—Polymerization of VDF/TrFE in the Presence of Monomer (Az3) (10% Moles)

Same procedure as detailed in Polymerization Example 6 was followed except by using 1.1 g of monomer (Az3) of formula $CH_2=CH-(CF_2)_6-CH_2CH_2N_3$ instead of monomer (Az1) and 2 ml of an organic initiator, namely ditert butyl peroxide (DTBP), instead of the APS aqueous solution. With a set-point temperature of 105° C., final pressure was about 3.4 abs bar. 8.3 grams of polymer were obtained, whose nominal composition was as follows: VDF: 67.5% moles; TrFE: 21.5% moles; monomer (Az3): 10% moles.

Comparative Polymerization Example 8—Manufacture of a Copolymer VDF-TFE (Molar Ratio: 75/25%/%) in the Absence of Azide Monomer In an AISI 316 steel horizontal autoclave equipped with baffles, and stirrer working at 90 rpm, 14 l of demineralized water was introduced. Then the temperature was brought to reaction temperature of 120° C., when this temperature is reached, 135 g of sodium based micro emulsion prepared as described in Example 1 of U.S. Pat. No. 7,122,608 (SOLVAY SOLEXIS S.P.A.) Oct. 17, 2006, 7.35 absolute bars of vinilidene fluoride were introduced. By a compressor a gaseous mixture of VDF-TFE in a molar nominal ratio of 75/25 is added until reaching a pressure of 30 absolute Bar.

The composition of the gaseous mixture present in the autoclave head was analyzed by G.C. Before the reaction starts, the gaseous phase was found to be composed of: 81.7% moles VDF, 18.3% moles TrFE. Then by a metering, 69 cc of pure Di-tertbutyl peroxide (DTBP) were fed. The polymerization pressure was maintained constant by feeding the above mentioned monomeric mixture; when 2% of the mixture were fed, the temperature was lowered to 105° C.; when 4000 g of the monomer mixture were fed, feeding was interrupted, and pressure feel down to 15 abs bar at temperature set-point. Then reactor was cooled at room temperature, the latex was recovered and coagulated by freezing for 48 hours. The polymer was finally washed with demineralized water and dried at 100° C. for 36 hours.

Characterization of the Polymers of Examples 4 to 8C

The polymers obtained from Examples 4 to 8C were submitted to DSC analyses according to ASTM D 3418 and to gel permeation chromatography for molecular weight determination. Results are detailed in table herein below.

TABLE 1

| Polymer | $T_g$ (° C.) | $T_{xx}$ (° C.) | $T_{Curie2}$ (° C.) | $T_{m2}$ (° C.) | GPC Mp* |
|---|---|---|---|---|---|
| Ex. 4 | −6.0 | 66.2 | 93.5 | 110 | 59000 |
| Ex. 5 | −23.3 | 60.6 | 91.8 | 91.8 | 28000 |
| Ex. 6 | −24.2 | 70.4 | 108.6 | 108.6 | 34000 |
| Ex. 7 | −19.7 | 97.2 | 120 | 129 | 43000 |
| Ex. 8C | −34.2 | 128.1 | 110 | 144.2 | 180000 |

*Mp is the sequence molecular weight, as determined by GPC

Manufacture of Films and Crosslinking Thereof Using Polymers of Examples 4, 5, 7 and 8C A) Spin Coating Specimens of the polymers obtained as detailed in Examples 3 to 5C, were dissolved in cyclopentanone so as to provide, after 3 hours stirring at a temperature of 40° C., clear solutions having a concentration of 8% in weight.

Said solutions were loaded into a Laurell WS-650 LITE SERIES spin coater and spin-coated at a speed of 2000 rpm onto glass substrates in order to obtain very thin polymeric layers on glass as substrates. The polymer layers so obtained were dried at 85° C. for 2 minutes. For each example, two polymeric films on glass were prepared.

All the samples obtained by the spin coating process, were all homogeneous, completely transparent and in the thickness range of 150-180 nm, as measured with Filmetrics F20 unit.

B) Crosslinking:

The polymer films obtained as above detailed were submitted to cross-linking procedures, either via thermal treatment or by UV treatment. Thermal treatment consisted in maintaining samples of films in a ventilated oven at a temperature of about 120 to 135° C.

For UV treatment, samples of films were passed through a semi automatic cross linker device, based on a UV lamp and equipped with a moving belt carrying the samples. Procedure was repeated so as to achieve the below detailed residence time under UV exposure.

In order to verify if the samples were crosslinked, pure acetone was poured on the films after treatment above: insolubility in such conditions was considered to be a clear evidence of suitable crosslinking. Results are summarized in the following table.

TABLE 2

| Polymer | From Ex. 4 | From Ex. 5 | From Ex. 7 | From Ex. 8C |
|---|---|---|---|---|
| Film thickness (μm) | 160 | 175 | 171 | 162 |
| Solubility in acetone before any treatment | soluble | soluble | soluble | soluble |
| Thermal treatment: 130° C. for 20 minutes | | | | |
| Solubility in acetone | insoluble | insoluble | insoluble | soluble |
| UV treatment: 4 seconds | | | | |
| Solubility in acetone | insoluble | insoluble | insoluble | soluble |

Table herein above well demonstrate that polymers (F) according to the invention are effective in crosslinking under effect either of thermal treatment or of UV treatment. On the contrary, a VDF-TrFE polymer free from recurring units of type (Az) does not undergo similar crosslinking.

Determination of Ferroelectric Properties by P-E Hysteresis Loop

Specimens having dimensions 4 cm×4 cm were cut off from the spin-coated films obtained as above detailed from polymer of Ex. 4 and of Ex. 6.

A silver layer was deposited on said specimens in order to have a total electrode area of 7 $cm^2$ and providing a better electrical conductivity. Before the test, each sample was cured and then annealed at temperature of 130° C. for two hours in order to increase the polymer crystallinity. P-E hysteresis curves were recorded by means of a Ferroelectric Radiant Equipment (Precision II) using an applied equivalent voltage of 150 v/micron with a bipolar drive, with a precision of ±3-5%. The plot pf the recorded hysteresis curves is provided in FIG. 1 while Table 3 herein below summarizes some critical data.

TABLE 3

| Example | $P_{Max}$ ($\mu C/cm^2$) | $P_r$ ($\mu C/cm^2$) |
|---|---|---|
| 6 | 3.46 | 2.05 |
| 4 | 3.68 | 2.16 |

The table herein above well demonstrate the ability of the VDF-TrFE copolymers of the invention of delivering outstanding ferroelectric properties when incorporating vinyl-type azide monomer (Az1) or allyl-type azide monomer (Az 2).

Preparative Example 9—Synthesis of
$N_3SO_2CF_2CF_2$—O—$C_4F_8$—O—$CF_2CF_2SO_2N_3$
[Azide Agent (Cz1)]

A disulfonylfluoride precursor was obtained by radical dimerization of $CF_2$=$CFOCF_2CF_2SO_2F$ (VEFS) in the presence of $F_2$; molar composition as determined by $^{19}F$-NMR of the raw precursor was found to correspond to a 70/30 mol/mol mixture of $FSO_2CF_2CF_2O(CF_2)_4OCF_2$ $CF_2SO_2F$ over sum of $(FSO_2CF_2CF_2OCF(CF_3))_2FSO_2$ $CF_2CF_2OCF(CF_3)CF_2CF_2OCF_2CF_2SO_2F$.

In a glass round-bottomed flask, equipped with condenser cooled with water, magnetic stirring, thermometer and dropping funnel, 1.27 g (19.56 mmoles) of $NaN_3$ and 14 ml of $CH_3OH$ were introduced. The opalescent mixture was then cooled at 3° C. with an ice bath; once cooled down at this set-point temperature, 5.00 g (8.36 mmoles=16.7 meq) of the above mentioned di-sulfonylfluoride isomers were added dropwise during about 17 minutes.

During this addition, exothermic reaction caused a temperature increase of about 10° C., with temperature rising from 3° C. to about 13° C. Once the temperature reverted back to 3° C., the mixture was maintained under stirring (750 rpm) at such temperature for 60 minutes. Then, the temperature was let warming to room temperature (20° C.) during 60 minutes and further maintained under stirring at such temperature for additional 15 hours. At the end of the reaction, the mixture was washed with 75 ml of distilled water. A colorless oil, slightly opalescent, immediately precipitated, which was filtered through a PTFE membrane (0.2 μm) to provide a perfectly clear and colorless oil.

Conversion of —$SO_2F$ groups: 99% moles
Yield=60% moli
Selectivity=100%
Isomers molar ratio (linear/branched): 75.5/24.5
Density=1.68 g/ml
$N_3SO_2{}^aCF_2{}^bCF_2O^bCF_2{}^cCF_2{}^cCF_2{}^bCF_2O^bCF_2{}^aCF_2SO_2N_3$;
$N_3SO_2{}^aCF_2{}^b CF_2O^dCF(^eCF_3)^cCF_2{}^bCF_2O^bCF_2{}^aCF_2SO_2N_3$;
$^{19}F$-NMR; (CDCl$_3$; ppm): a: −111 (m) e −114 (m); b: −75 (m); c: −121 (m); d: −139 (m); e: −80 (m).
FT-IR (KBr; cm$^{-1}$): 2283 e 2155 (—$N_3$ st.); 1460 e 1422 (—$SO_2$—$N_3$ st.); 1200-1140 (CF st.).

Preparative Example 10—Synthesis of $N_3CH_2CH_2$ $(CF_2)_6CH_2CH_2N_3$ [Azide Agent (Cz2)]

A di-iodinated precursor was manufactured by tetrafluoroethylene ($C_2F_4$) telomerization with iodine ($I_2$) in the presence of diterbutylperoxide (DTBP), and isolating a $I(CF_2)_6I$ fraction.

Ethylene addition was then performer with ethylene at a temperature of 180° C. and under a $C_2H_4$ pressure of 50 atm, so as to obtain corresponding addition product of formula $ICH_2CH_2(CF_2)_6CH_2CH_2I$ with a selectivity of more than 98.5%. Less than 1.5% moles of the telomer gave rise to the oligomer $I(C_2H_4)_2(CF_2)_6CH_2CH_2I$.

A procedure similar to techniques described in the literature (KARIMI ZARCHI, M. A., et al. A mild and clean synthesis of alkyl azides from alkyl halides mediated by poly(4-vinylpyridine)-supported sodium azide under non-aqueous conditions. *J. Appl. Polym. Sci.* 2011, vol. 121, p. 1916-1920.; ITO, M., et al. A simple and conveniente synthesis of alkyl azides under mild conditions. *Synthesis*. 1995, no. 4, p. 376-378.) was followed for introducing —$N_3$ group; the procedure followed is detailed herein below. In a glass round-bottomed flask, equipped with condenser cooled with water, magnetic stirring, thermometer and dropping funnel, 2.13 g (32.8 mmoles) of $NaN_3$ homogeneously dissolved in 11 ml of distilled water were introduced. Then 310 μl of a phase transfer catalyst commercially available as Aliquat ($CH_3$—N—$[(CH_2)_7CH_3]_3{}^+Cl^-$), were also introduced, and immediately separated from the aqueous phase. The reaction mixture was then cooled down under stirring (1000 rpm) at 3° C. with an ice bath, and 5.00 g (8.2 mmoles=16.4 meq) of I—$CH_2CH_2$—$(CF_2)_6$—$CH_2CH_2$—I diluted in 20 ml di $CH_2Cl_2$ were added dropwise during about 15 minutes.

After 60 minutes stirring at 3° C., the temperature was let to revert to room temperature (24° C.) during 90 minutes. Mixture was then maintained at 24° C. and 1000 rpm during 15 hours. A colour change was noticed during the course of the reaction; at the end of the addition, the lower organic phase (comprising $CH_2Cl_2$) was reddish, because of the presence of —$CH_2I$ moieties, while, as the reaction proceeded, said phase discoloured progressively and became pale yellowish, due to the formation of —$CH_2N_3$, which is a colorless chromophore. In parallel, upper aqueous phase progressively was found to change from colorless ($NaN_3$) to yellow/orange (NaI). The lower organic phase was recovered and dried on $MgSO_4$; after filtration, $CH_2Cl_2$ was then evaporated. A waxy white solid was thus obtained, containing residual traces of Aliquat. The solid was thus re-dissolved in $CH_2Cl_2$ and was eluted on a $SiO_2$ column with 4 volumes of $CH_2Cl_2$, while Aliquat remained entrapped in the column.

Conversion=95.2% moles
Yield=95% moles
—$N_3$ functionality=1.905 (the presence of 4.8% moles of end groups of formula —$CF_2I$).
$N_3{}^aCH_2{}^bCH_2{}^cCF_2{}^dCF_2{}^eCF_2{}^eCF_2{}^dCF_2{}^cCF_2{}^bCH_2{}^aCH_2N_3$
$^{19}F$-NMR; (CDCl$_3$; ppm): c: −115; d: −122; e: −124;
$^1H$-NMR (CDCl$_3$; ppm): a: 2.95; b: 3.4.
FT-IR (KBr; cm$^{-1}$): 2955 (—$CH_2$— st); 2100 (—$N_3$ st.); 1263 (—C—N— st.); 1200-1140 (CF st.).

Preparative Example 11—Synthesis of VDF/TrFE Oligomer Terminated with $N_3$ Groups [Azide Agent (Cz3)]

A very low molecular weight VDF/TrFE oligomer was manufactured by emulsion polymerization using $C_4F_8I_2$ as chain transfer agent. Quantitative $^{19}F$-NMR analyses in DMSO d$_6$ gave following characterization for the oligomer: Mw=20659 g/moles; VDF=86% moles; TrFE=13.7% moles; —$CF_2CH_2I$=0.2% moles; —$CF_2CH_2OH$=0.43% moles.

End groups of formula —CF$_2$CH$_2$I, of high stability, were obtained during polymerization by scission of end groups of formula —CH$_2$CF$_2$I, obtained from chain transfer agent, which have very poor stability. These are the groups which were to be reactive sites for nucleophilic substitution with NaN$_3$. End groups of formula —CF$_2$CH$_2$OH were obtained from hydrolysis of end groups of formula —CF$_2$CH$_2$I which occurred during polymerization in aqueous phase in the presence of radical initiator APS.

In a glass round-bottomed flask, equipped with condenser cooled with water, magnetic stirring, thermometer and dropping funnel, 9.24 g (0.894 μmoles, in view of Mw=20659) of the above mentioned oligomer in powder form dissolved in 70 ml of DMSO, were introduced, thus providing a 6.37 mM polymer solution and a 12.8 μM solution of reactive groups of formula —CF$_2$CH$_2$I.

A large excess of NaN$_3$ (90 mg=1.38 mmol=1543 meq) was then added at 20° C. during 10 minutes and the solution was heated at 45° C. The solution became dark red, because of the formation of NaI within about 2 hours. The reaction was pursued for additional 3 hours, until achieving a total reaction time of 5 hours.

At the end of the reaction, the oligomer comprising azidic group was precipitated by pouring the solution in 500 ml of distilled water. The oligomer was recovered as a fibrous and rubbery solid; it was rinsed on a cellulose filter over a Büchner funnel with about 2 liters of distilled water and then with 2 portions (300 ml each) of CH$_2$Cl$_2$ so as to extract residual DMSO adsorbed into the oligomer or swelling the same.

The oligomer was finally dried in an oven at 50° C. under reduced pressure (10 mm Hg). Analyses yielded following results:

Mw azidic oligomer=20650 g/mol; Yield=64% wt vs. initial weight of polymer; Acetone solubility: complete at 20° C.; FT-IR (DMSO; cm$^{-1}$): 2115 (—N$_3$ st.).

Manufacture of Films and Crosslinking Thereof Using Polymers of Examples 6 and 8C in Combination with Bis-Azide Crosslinking Agents (Cz1), (Cz2) and (Cz3)

Same procedure as above detailed was followed, but using polymers 4 and 8C in combination with bis-azide crosslinking agents (Cz1), (Cz2) and (Cz3) in same cyclopentanone solution. Results are provided in Tables 4 and 5, herein below.

TABLE 4

| | Polymer | | |
| --- | --- | --- | --- |
| | From Ex. 4 | From Ex. 4 | From Ex. 4 |
| Curing agent (type) | (Cz1) | (Cz2) | (Cz3) |
| Polymer/curing agent | 90/10 wt/wt | 90/10 wt/wt | 90/10 wt/wt |
| Film thickness (μm) | 173 | 152 | 165 |
| Solubility in acetone before any treatment | soluble | soluble | soluble |
| Thermal treatment: 130° C. for 20 minutes | | | |
| Solubility in acetone | insoluble | insoluble | insoluble |
| UV treatment: 4 seconds | | | |
| Solubility in acetone | insoluble | insoluble | insoluble |

TABLE 5

| | Polymer | | |
| --- | --- | --- | --- |
| | From Ex. 8C | From Ex. 8C | From Ex. 8C |
| Curing agent (type) | (Cz1) | (Cz2) | (Cz3) |
| Polymer/curing agent | 90/10 wt/wt | 90/10 wt/wt | 90/10 wt/wt |
| Film thickness (μm) | 169 | 158 | 173 |
| Solubility in acetone before any treatment | soluble | soluble | soluble |
| Thermal treatment: 130° C. for 20 minutes | | | |
| Solubility in acetone | soluble | soluble | soluble |
| UV treatment: 4 seconds | | | |
| Solubility in acetone | soluble | soluble | soluble |

Table herein above well demonstrate that polymers (F) according to the invention are effective in crosslinking in combination with curing agent of bis-azide type (Cz), under effect either of thermal treatment or of UV treatment. On the contrary, a VDF-TrFE polymer free from recurring units of type (Az) does not undergo similar crosslinking, even in combination with bis-azide curing agents (Cz).

The invention claimed is:

1. A semi-crystalline fluoropolymer (F) comprising:
   recurring units derived from vinylidene fluoride (VDF);
   from 10% to 50% by moles with respect to the total moles of recurring units of fluoropolymer (F) of recurring units derived from trifluoroethylene (TrFE); and
   from 0.01% to 10% by moles with respect to the total moles of recurring units of fluoropolymer (F) of recurring units derived from at least one monomer (Az) comprising an azide group.

2. The fluoropolymer (F) of claim 1, wherein monomer (Az) is selected from monomers of formula (I):

$$CX_1X_2=CX—(O)_p—R_f—(CH_2)_n—[S(O)_q]_sN_3 \quad (I)$$

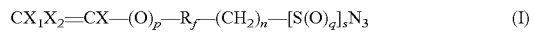

wherein: X, X$_1$ and X$_2$, equal to or different from each other, are independently H or F, p is 0 or 1, n is 0 to 4, s is 0 or 1, q is 1 or 2, R$_f$ is a divalent (hydro)fluorocarbon group, optionally interrupted by one or more ethereal oxygen atoms.

3. The fluoropolymer (F) of claim 2, wherein monomer (Az) is selected from monomers of formula (II):

$$CX_1X_2=CX—O—R_f—(CH_2)_n—[S(O)_q]_sN_3 \quad \text{formula (II)}$$

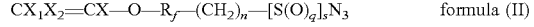

wherein: X, X$_1$ and X$_2$, equal to or different from each other, are independently H or F, n is 0 to 4, s is 0 or 1, q is 1 or 2, R$_f$ is a divalent (hydro)fluorocarbon group, optionally interrupted by one or more ethereal oxygen atoms.

4. The fluoropolymer (F) of claim 2, wherein monomer (Az) is selected from monomers of formula (IV):

$$CX''_1X''_2=CX''—R''_f—(CH_2)_{n''}—[S(O)_{q''}]_{s''}N_3 \quad (IV)$$

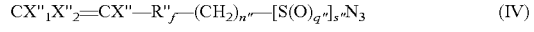

wherein: X'', X''$_1$ and X''$_2$, equal to or different from each other, are independently H or F, n'' is 0 to 4, s'' is 0 or 1, q'' is 1 or 2, R''$_f$ is a divalent (hydro)fluorocarbon group, optionally interrupted by one or more ethereal oxygen atoms,
wherein the sp$^2$ hybridized carbon atom of the terminal double bond =CX''— is bound to a sp$^\alpha$ carbon atom of the R''$_f$ group.

5. The fluoropolymer (F) of claim 4, wherein monomer (Az) is selected from monomers of formula (V):

$$CX''_1X''_2=CX''—R''_f—(CH_2)_{n''}—S(O)_2N_3 \quad (V),$$

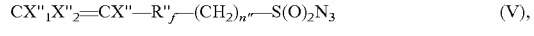

wherein: X", X"$_1$ and X"$_2$, equal to or different from each other, are independently H or F, n" is 0 to 4, R"$_f$ is a divalent (hydro)fluorocarbon group, optionally interrupted by one or more ethereal oxygen atoms, wherein the sp$^2$ hybridized carbon atom of the terminal double bond =CX"— is bound to a sp$^a$ carbon atom of the R"$_f$ group.

6. The fluoropolymer (F) of claim 5, wherein monomer (Az) is selected from monomers of formula (VI):

$$CX"_1X"_2=CX"-R^*_f-SO_2N_3 \qquad (VI),$$

wherein: X", X"$_1$ and X"$_2$, equal to or different from each other, are independently H or F, R*$_f$ is a divalent perfluoroalkyl group, optionally interrupted by one or more ethereal oxygen atoms.

7. The fluoropolymer (F) of claim 5, wherein monomer (Az) is selected from monomers of formula (VIII):

$$CX"_1X"_2=CX"-R^*_f-(CH_2)_{n^*}-SO_2N_3 \qquad (VIII),$$

wherein: X", X"$_1$ and X"$_2$, equal to or different from each other, are independently H or F, n* is an integer of 1 to 4, preferably 2 or 4, more preferably n* is 2; R*$_f$ is a divalent perfluoroalkyl group, optionally interrupted by one or more ethereal oxygen atoms.

8. The fluoropolymer (F) of claim 5, wherein monomer (Az) is selected from monomers of formula (X):

$$CX^a_1X^a_2=CX^a-CF_2-O-R^a_f-(CH_2)_{na}-SO_2N_3 \qquad (X),$$

wherein: X", X"$_i$ and X"$_2$, equal to or different from each other, are independently H or F, na is 0 to 4 and —R$^a_f$— is a divalent perfluoroalkyl group having 1 to 6 carbon atoms.

9. The fluoropolymer (F) of claim 4, wherein monomer (Az) is selected from monomers of formula (XII):

$$CX"_1X"_2=CX"-R"_f-(CH_2)_{n"}-N_3 \qquad (XII),$$

wherein: X", X"$_1$ and X"$_2$, equal to or different from each other, are independently H or F, n" is 0 to 4, R"$_f$ is a divalent (hydro)fluorocarbon group, optionally interrupted by one or more ethereal oxygen atoms, wherein the sp$^2$ hybridized carbon atom of the terminal double bond =CX"— is bound to a sp$^a$ carbon atom of the R"$_f$ group.

10. A process for the manufacture of the fluoropolymer (F) according to claim 1, said process comprising polymerizing a monomer mixture comprising vinylidene fluoride, trifluoroethylene and at least one monomer (Az).

11. A crosslinkable composition (CC) comprising fluoropolymer (F) according to claim 1 and at least one curing agent in an amount of between 0.5% and 10% by weight relative to fluoropolymer (F).

12. The crosslinkable composition (CC) of claim 11, further comprising at least one curing agent selected from the group consisting of:
polyallyl derivatives comprising more than one ethylenically unsaturated allylic double bond;
polyvinyl derivatives comprising more than one ethylenically unsaturated vinyl double bond;
bis-olefin (OF) having general formula:

$$R_1R_2C=C-Z-C=CR_5R_6$$
$$\qquad\quad |\qquad\quad |$$
$$\qquad\quad R_3\qquad R_4$$

wherein R$_1$, R$_2$, R$_3$, R$_4$, R$_5$ and R$_6$, equal or different from each other, are H or C$_1$-C$_5$ alkyl; Z is a group of formula —(O)$_{e1}$-E-(O)$_{e2}$—, wherein e1 and e2, equal to or different from each other are independently 1 or 0, and E is a divalent C$_1$-C$_{18}$ group, optionally containing oxygen atoms, optionally at least partially fluorinated;
triazines substituted with ethylenically unsaturated groups; and
polyazide compounds comprising more than one azide group.

13. A method of forming a cured article, the method comprising crosslinking the fluoropolymer (F) according to claim 1 such that a cured article is formed.

14. A method for manufacturing an electrical or electronic device, the method comprising processing the fluoropolymer (F) of claim 1, and crosslinking the processed fluoropolymer (F).

15. The method of claim 14, wherein processing is effected by a solution processing technique selected from the group consisting of ink printing, casting, lithographic process.

16. A method of forming a cured article, the method comprising crosslinking the crosslinkable composition (CC) according to claim 11, such that a cured article is formed.

17. A method for manufacturing an electrical or electronic device, the method comprising processing the crosslinkable composition (CC) according to claim 11, and crosslinking the processed crosslinkable composition (CC).

18. The crosslinkable composition (CC) of claim 12, wherein the polyallyl derivative comprising more than one ethylenically unsaturated allylic double bond is selected from triallyl cyanurate, triallyl isocyanurate (TAIC), tris (diallylamine)-s-triazine, triallyl phosphite, N,N-diallylacrylamide, N,N,N',N'-tetraallylmalonamide and mixtures thereof.

19. The crosslinkable composition (CC) of claim 12, wherein the polyvinyl derivative comprising more than one ethylenically unsaturated vinyl double bond is selected from trivinyl isocyanurate, 2,4,6-trivinyl methyltrisiloxane and mixtures thereof.

20. The crosslinkable composition (CC) of claim 12, wherein the polyazide compound comprising more than one azide group is at least one diazide selected from diazides of formula:

$$\{N_3-[S(O)_{qd}]_{sd}\}_{j}\text{-}J_{d}\text{-}\{[S(O)_{qd'}]_{sd'}-N_3\}_{j'}$$

wherein each of j and j', equal to or different from each other, is 0 or an integer of 1 to 3, provided that j+j' is of at least 2, each of sd and sd', equal to or different from each other is independently 0 or 1, each of qd and qd', equal to or different from each other is independently 1 or 2, and J$_d$ is a (hydro)(fluoro)carbon group, optionally containing oxygen atoms, optionally at least partially fluorinated.

21. The fluoropolymer (F) of claim 1, wherein the amount of recurring units derived from at least one monomer (Az) is from 0.04% to 6% by moles with respect to the total moles of recurring units of fluoropolymer (F).

22. The fluoropolymer (F) of claim 21, wherein fluoropolymer (F) is ferroelectric.

* * * * *